United States Patent
D'Aquila

(10) Patent No.: US 9,933,266 B2
(45) Date of Patent: Apr. 3, 2018

(54) METHOD FOR THE LOCALIZATION OF AN INDIVIDUAL

(71) Applicant: GIPSTECH S.R.L., Rende (IT)

(72) Inventor: Gaetano D'Aquila, Rende (IT)

(73) Assignee: GIPSTECH S.R.L., RENDE (IT)

( * ) Notice: Subject to any disclaimer, the term of this patent is extended or adjusted under 35 U.S.C. 154(b) by 0 days.

(21) Appl. No.: 15/320,631

(22) PCT Filed: Jun. 25, 2015

(86) PCT No.: PCT/EP2015/064400
§ 371 (c)(1),
(2) Date: Dec. 20, 2016

(87) PCT Pub. No.: WO2015/197769
PCT Pub. Date: Dec. 30, 2015

(65) Prior Publication Data
US 2017/0176189 A1    Jun. 22, 2017

(30) Foreign Application Priority Data

Jun. 26, 2014 (IT) .............................. CS2014A0020

(51) Int. Cl.
*G01C 21/16* (2006.01)
*G01C 21/20* (2006.01)
*G06F 17/30* (2006.01)

(52) U.S. Cl.
CPC .......... *G01C 21/206* (2013.01); *G01C 21/16* (2013.01); *G06F 17/30241* (2013.01); *G06F 17/30321* (2013.01)

(58) Field of Classification Search
None
See application file for complete search history.

(56) References Cited

U.S. PATENT DOCUMENTS

2004/0254727 A1 * 12/2004 Ockerse ................. G01C 17/28
701/535
2012/0143495 A1    6/2012 Dantu
(Continued)

FOREIGN PATENT DOCUMENTS

CN          103175529 A       6/2013

OTHER PUBLICATIONS

International Search Report & Written Opinion dated Sep. 4, 2015 from corresponding International PCT Application No. PCT/EP2015/064400, 11 pages.
(Continued)

*Primary Examiner* — Jonathan M Dager
*Assistant Examiner* — Garrett F Evans
(74) *Attorney, Agent, or Firm* — Innovation Capital Law Group, LLP; Vic Lin

(57) ABSTRACT

A method for the localization of an individual, which comprises: —detecting a displacement associated with a movement of said individual; —recording environmental signals recordable during said step and forming a detected time series; —applying said displacement to the particles of a particle filter; —assigning a similarity index to each particle of the particle filter; —resampling the particle filter; —assuming, as the estimated position of the individual, the position of the particle having the greatest value of the similarity index or the center of a group of particles having a predefined common characteristic.

8 Claims, 3 Drawing Sheets

(56) References Cited

U.S. PATENT DOCUMENTS

2014/0171114 A1    6/2014  Marti et al.
2016/0146945 A1*   5/2016  Kamijo ................... G01S 19/22
                                                           342/357.61

OTHER PUBLICATIONS

Italian Search Report dated Mar. 6, 2015 from corresponding Italian Application No. CS20140020, 10 pages.
Kalyan Pathapati Subbu et al: "Indoor localization through dynamic time warping", Systems, Man, and Cybernetics (SMC), 2011 IEEE International Conference on, IEEE, Oct. 9, 2011 (Oct. 9, 2011), pp. 1639-1644.
Peng Zhuang et al: "Smart: Simultaneous indoor localization and map construction using smartphones", Neural Networks (IJCNN), The 2010 International Joint Conference on, IEEE, Piscataway, NJ, USA, Jul. 18, 2010 (Jul. 18, 2010), pp. 1-8.
Kurbalija Vladimir et al., "A Framework for Time-Series Analysis", D. Dicheva and D. Dochev (Eds.): AIMSA 2010, LNAI 6304, pp. 42-51, 2010.
Madgwick, "An efficient orientation filter for inertial and inertial/magnetic sensor arrays", Department of Mechanical Engineering, University of Bristol, Apr. 2010, 32 pages.
Marins, et al., "An Extended Kalman Filter for Quaternion-Based Orientation Estimation Using MARG Sensors", 2001 IEEE/RSJ International Conference on Intelligent Robots and Systems, Maui, Hawaii, USA, Oct. 29-Nov. 3, 2001, pp. 2003-2011.
Simon, Dan, "Optimal State Estimation", John Wiley & Sons, Inc., New Jersey, 2006, 550 pages.
Thrun et al., "Probabilistic Robotics", The MIT Press, Cambridge, Massachusetts, 2005, 668 pages.

* cited by examiner

METHOD FOR THE LOCALIZATION OF AN INDIVIDUAL

The present invention relates to a method for the localization of an individual.

In particular, the present invention relates to a method for the localization of a portable device transported by a person who is moving inside artificial structures, like buildings, or natural structures. Therefore, the present invention falls within the field of devices for navigating in indoor environments.

Today, there is a known localization method described in the U.S. application US2012/0143495.

This traditional localization method is implementable in a program for a portable localization device and has the object of providing an estimate of the position of the latter.

According to this traditional method, the position of the localization device is estimated through the combined analysis of data provided by an accelerometer present inside the device and data relating to signals that the device detects in the environment in which it is located.

During the movement of the localization device, the latter produces an estimate of its displacement vector on the basis of the acceleration sensed by the accelerometer.

The localization device is also provided with a magnetometer, a microphone, radio receivers and other types of sensors serving to detect the corresponding environmental signals.

According to this traditional method, a time sequence of signals detected by the aforesaid sensors during a movement from a first to a second point in space, for example from the beginning to the end of a hallway using a single path or a number of adjacent paths.

Each time sequence of signals detected by the device constitutes a signature identifying the movement made in the environment in which the localization device is in motion.

The traditional method in question provides for the detected signature to be compared with comparison signatures stored in a database which in turn were collected beforehand using the same device or other suitable devices.

In this database each comparison signature corresponds to a spatial position which the comparison signature has been associated with beforehand by detecting the environmental signals.

As noted, if the signature is collected travelling along a hallway in a straight line, the signature is spatially associated, or "georeferenced" in jargon, with the spatial coordinates of the points ideally located on the straight line corresponding to the trajectory walked.

Therefore, it is possible to localize the device in the position associated with the comparison signature which matches the detected signature.

To achieve this localization, the traditional method makes a comparison between the signature detected and all the signatures contained in the database.

However, this localization is only an estimate and, according to the traditional method in question it is combined with the data provided by the accelerometer in order to produce a more precise estimate of the position by means of a particle filter.

Furthermore, the detected signature can be deformed by the speed of the movement during which it was collected, as well as, obviously, by possible interferences.

Therefore, in the aforesaid step of comparing the detected signature with the reference signatures, the traditional method in question envisages adopting an alignment algorithm, for example DTW, to align the time series of detectings constituting the signature being compared.

The problem at the basis of the present invention is to reduce the error in estimating position compared to traditional techniques.

The main task of the present invention consists in devising a method for localizing an individual which provides a solution for this problem by overcoming the drawbacks of the traditional methods described above. Within the scope of this task, it is an object of the present invention to propose a localization method that is easily implementable in software for smartphones. Another object of the present invention consists in devising a localization method making it possible to use less computing resources compared to traditional methods, the precision of the localization being equal. This task, as well as these and other objects that will become more apparent below, are achieved by a localization method according to the accompanying claim 1.

Details of the features of the localization method according to the invention are disclosed in the dependent claims.

Additional features and advantages of the invention will become more apparent from the description of a preferred, but non-exclusive embodiment of the localization method according to the invention, illustrated by way of non-limiting example in the appended drawings, in which:

FIG. 1 illustrates a second simplified scheme of a localization method according to the invention FIG. 2 illustrates a schematic perspective view of an interior in which a user is moving, with, applied to the interior, an example of a map of environmental signals FIG. 3 illustrates an example of the measurement of the acceleration modulus obtained by using an accelerometer with an indication of the detectable steps;

Figure 1:
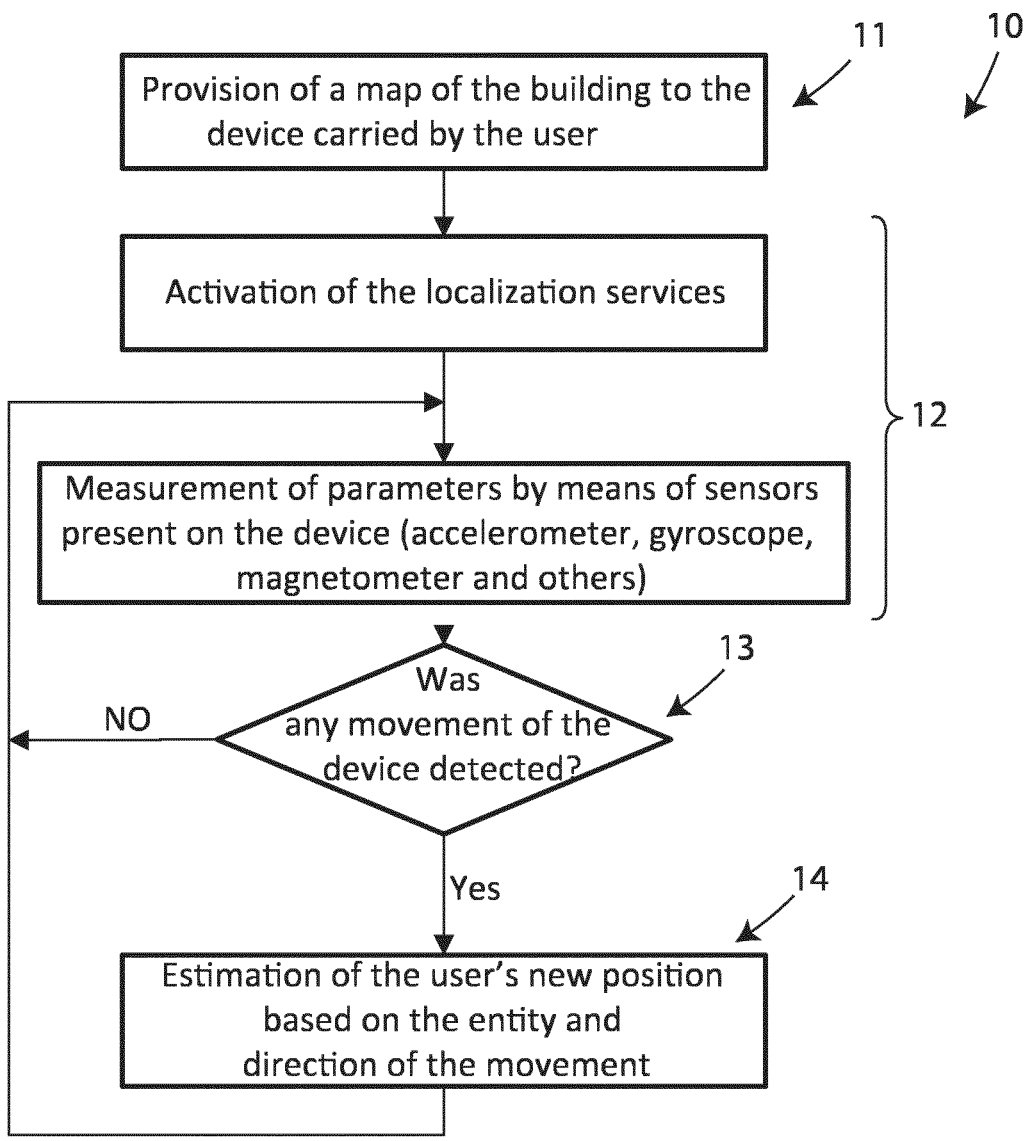

With particular reference to the above-mentioned figures, 10 denotes in its entirety a method for the localization of an individual.

The present method 10, according to the present invention, comprises:
- detecting a displacement associated with a movement of said individual;
- recording environmental signals recordable during said movement, said environmental signals forming a detected time series;
- estimating the position of the individual by using a particle filter.

This estimation step comprises:
- applying said displacement to the particles of a particle filter only at the end of said movement;
- assigning a similarity index to each particle of the particle filter, as described below;
- performing an operation of resampling the particles of the particle filter which preferably comprises making a selection of particles having a value of the similarity index that is larger than a predefined value;
- assuming the position of said individual to be the centre of a group of particles, of said selection, grouped according to a predetermined criterion.

In particular, the operation of applying the displacement to the particles of the particle filter provides for applying said displacement to every and each particle of the particle filter.

The operation of assuming the position of the individual advantageously comprises grouping the particles of the selection according to said predetermined criterion and subsequently assuming the position of the individual to be the geometric centre of the most numerous group of particles.

Preferably, the aforesaid predetermined criterion provides for the formation of groups of particles having a reciprocal distance that is less than a preset value.

In other words, the particles having a value of the similarity index that is lower than a predefined value are removed from the set of possible positions.

The particles with a similarity value that is higher than the predefined value are instead maintained, preferably also with repetition, within the set of possible candidates for the positions of the user. Advantageously, according to the present invention, said resampling step is carried out applying the method described in Dan Simon, "Optimal State Estimation", Ed. John Wiley & Sons, ISBN 0471708585, where following a normalization of the similarity indices of the set with a cardinality n containing all the particles, the following operations are performed for n iterations:

a. generation of a random number r uniformly distributed in [0,1];
b. examine of all particles of the starting set, adding the value of the similarity index until the sum exceeds the previous number r. The last particle considered in the sum and which has verified the condition of r being exceeded is included in the set of particles to be used in the subsequent iteration.

The similarity index associated with each particle, which in the traditional terminology is defined as "importance factor", is a parameter having a value that is proportional to the similarity of the detected time series to a mapped time series, which consists in a time series derived from a pre-constructed map M and corresponding to the time series that would be detected by an individual who was moving along the trajectory of said particle during said movement.

Preferably, said trajectory is assumed to be in a straight line.

Said displacement is preferably the basic unit for evolving the particle filter, which makes it possible to obtain a new estimate of the individual's position and which is advantageously given by a step of the individual, if the latter is walking, or a turn of the wheel if the individual is moving in a wheeled vehicle, or else can be given by a predefined distance traveled.

The similarity index is preferably given by the sum of the differences between the measurement in the map and the value detected during the movement of the individual.

If this sum tends towards zero it means that the sequences are substantially identical.

Advantageously, the step of detecting the movement comprises detecting a start condition and an end condition of the individual's movement.

Preferably, this movement detection step consists in sensing the start and end instants of a step of the individual.

Preferably, this movement detection step comprises using a means for sensing the dynamics of the individual to be localized.

Solely by way of non-exhaustive example, the aforesaid step start and end conditions can be detected by means of an accelerometer worn by the individual, for example fixed to the footwear of the latter.

The sequence of phases of acceleration and rest phases characteristic of the sequence of the steps is detected by the accelerometer.

Figure 3:
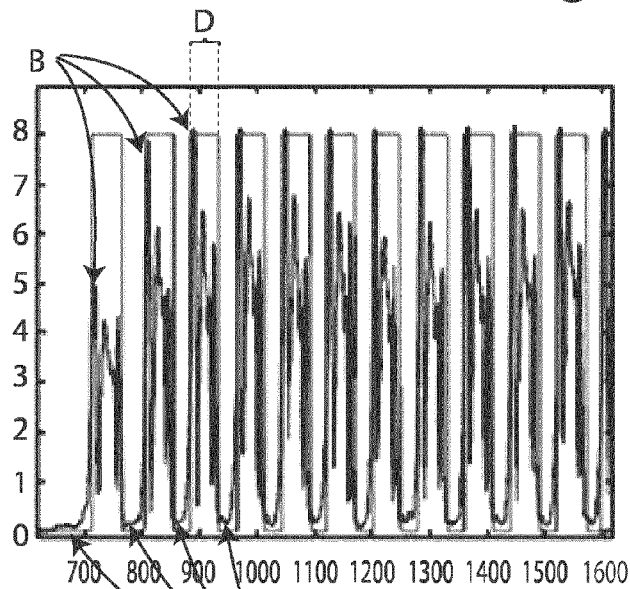

FIG. 3 shows, by way of non-limiting example, a diagram which illustrates the pattern of the acceleration modulus calculated based on the 3D measurement thereof and detected over time during a walk.

The acceleration peaks B corresponding to each step, alternating with the conditions of zero acceleration corresponding to the step start/end conditions C, are clearly evident in the figure.

Figure 4:
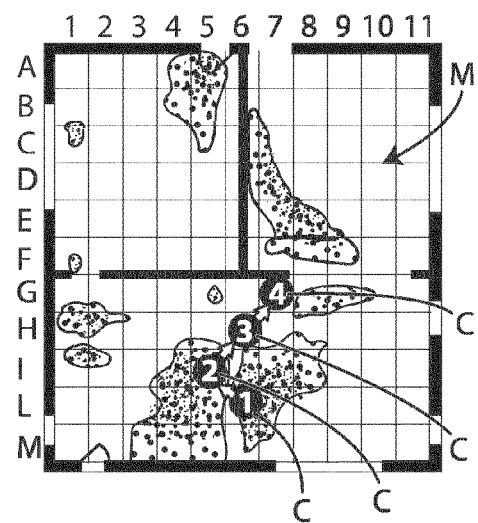
FIG. 4 illustrates a schematic plan view of the interior of FIG. 2.

It is clear that from the detecting, from which the diagram of FIG. 4 is derived, it is possible to derive the time D—the duration of each step—which is the time elapsing between two step start/end conditions C.

Advantageously, the movement is given by the length lp and the direction Psi of said step.

The direction Psi can be measured in a way that is in itself a traditional one, using a compass advantageously present on board of a portable device transported by the individual to be localized.

Figure 2:
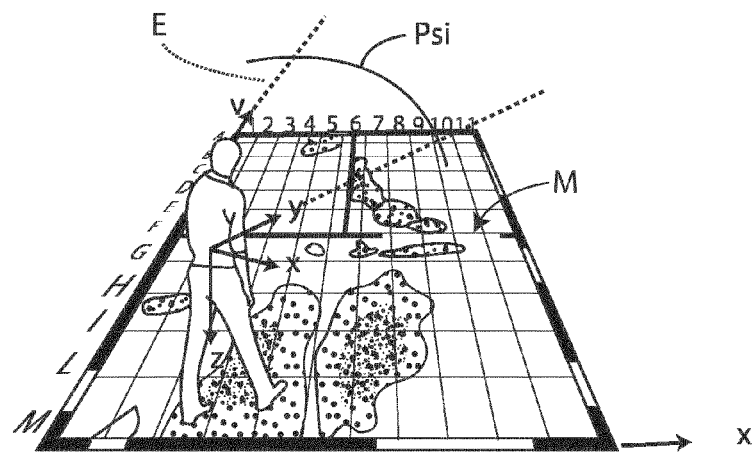

Preferably, said direction Psi is expressed as an angle relative to a reference direction E, as illustrated by way of non-limiting example in FIG. 2.

The aforesaid step of recording environmental signals preferably comprises the recording of geomagnetic signals, said time series being given by the geomagnetic field pattern over time, according to anyone or more predefined directions and advantageously according to 3 orthogonal directions, i.e. in 3D.

Figure 5A:
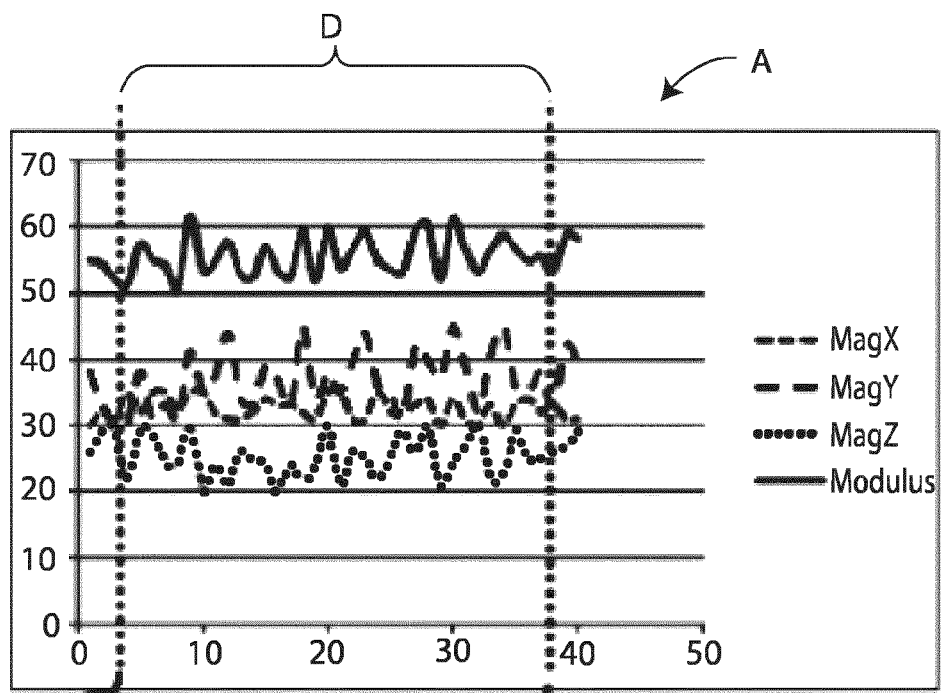
FIGS. 5a and 5b illustrate examples of time series used in the localization method according to the present invention and a detail of the same signals measured in the environment by means of the sensors of the device with an indication of how the signals can become misaligned based on the different speed at which the signatures are collected.
Figure 5B:
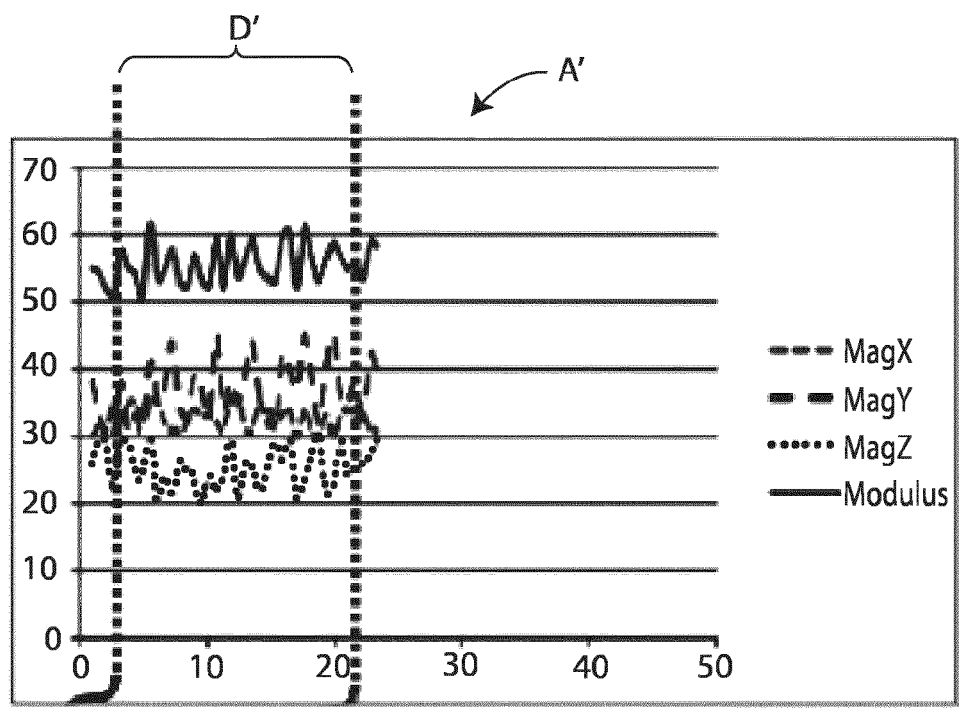

Two examples of time series, A and A', are illustrated in FIGS. 5a and 5b, respectively.

Advantageously, said geomagnetic signals comprise the components of the geomagnetic field evaluated relative to a predefined reference system, as exemplified in FIGS. 5a and 5b, where the components MagX, MagY and MagZ are represented, along with modulus "Modulus" of the vector of the geomagnetic field detected respectively during the times D, in FIG. 5a, and D', in FIG. 5b, equal to the duration of two movements of the user, where in the proposed example such movements are steps of the individual to be localized.

The movement of FIG. 5b has a smaller duration than the movement of FIG. 5a.

The step of recording environmental signals is preferably carried out by means of a portable device, advantageously consisting in a smartphone, carried by said individual during said movement.

Said step of assigning a similarity index to each particle of the particle filter advantageously comprises comparing the mapped time series associated with each particle with the detected time series and associating with each particle a similarity index which consists in a parameter indicating the similarity between the mapped time series and the detected time series.

From a comparison of FIGS. 5a and 5b, it is clear that the profile of a time series in general depends on the duration of the movement.

According to the present invention, to enable an effective alignment between a detected time series and the mapped time series, the present method advantageously envisages the use of a DTW algorithm, i.e. a dynamic time warping algorithm.

The expression "alignment" here means an operation of comparing time series with the aim of determining their correspondence or evaluating their similarity.

In particular, this comparison is made by means of an operation of distorting the sequences being compared in a non-linear manner relative to the independent variable time.

This operation is aimed at finding an optimal match between the two sequences, such as to determine the maximum likelihood thereof.

According to the present invention, the present method preferably comprises a preliminary mapping step which comprises:
- positioning an environmental signal sensor;
- recording the environmental signals detected by said sensor;
- associating said detected environmental signals with the position of said sensor;
- reiterating said positioning, recording and associating operations so as to form said map M of environmental signals associated with respective positions.

Preferably, the mapping step comprises moving the sensor into an area to be mapped and recording, for each position taken on by the sensor, the environmental signals detected in said position.

Preferably, the mapping step comprises:
- indicating the starting point of the portable device;
- starting the detecting of signals by transporting the portable device while travelling a path along a rectilinear trajectory inside the space;
- indicating the end point of the movement.

In this manner it is possible, based on the due assumptions, for example assuming a movement at a constant speed, and automatically associating each point in space comprised between the starting and end points of the movement, to measure the environmental signals detected.

Preferably, the step of detecting the movement associated with a movement of said individual comprises detecting a group of parameters comprising:
- the time instant at which the movement starts,
- the time instant at which the movement ends,
- the time duration of the movement,
- the length of the movement lp, i.e. the amount of space travelled during the movement,
- the direction of the movement, expressed as an angle relative to a reference direction.

Said movement is preferably a step of the individual. Advantageously, the step of recording environmental signals comprises combining the time series recorded during a step with the aforesaid group of parameters relating to said step.

The method according to the present invention can be implemented using a portable device equipped with the sensors necessary for determining the movement and direction of movement of the user.

According to anyone aspect of the invention, the method advantageously comprises the following steps:
- providing 11 the portable device with a map M of the area in which to localize the user,
- activating 12, automatically or at the user's command, sensor means, integrated in the device, designed to detect the aforesaid environmental signals;
- activating, automatically or at the user's command, means suitable for determining the dynamics of the user,
- verifying 13 if a movement of the user has been detected;
- if said movement has been detected, estimating 14 the position thereof at the end of the movement.

The aforesaid map M advantageously contains multiple items of information, for example images, vectorial representations, digital information and signal measurements, and can be provided to the device in different digital formats, as an image, a relational database or binary structure and though multiple methods, such as direct copying, sending by electronic means and the like.

The map M used in the method according to the present invention preferably contains the recording of at least one environmental signal associated with the positions of the map M.

Preferably, this environmental signal is a magnetic or geomagnetic or RF signal that can be sensed in the mapped area.

Preferably, the mapped area consists in the interior of a building.

Advantageously, the mapping step can be carried out by the same portable device that is designed to record the aforesaid environmental signals for localizing the user.

The map M is advantageously comparable to an arbitrary grid of steps, which can be overlaid on the plan of the building the map M is associated with and wherein every cell of the grid contains the measurement of the selected signal, measured for example using the aforesaid portable device and making the appropriate changes in the reference system as necessary and including the signal measurements in the reference system associated with the map of the building.

The measurement of the selected signal memorized in the map M entails at least memorizing the total intensity of thereof and, if the signal is a vectorial parameter, as for example in the preferred case of sensing the magnetic field, may entail the complete memorization of the vectorial components through which it is always possible to calculate the intensity of the vector.

In the case of applications of the present method using maps based on geomagnetic signals, the magnetometers present in smartphones are capable of making a three-dimensional measurement of the magnetic vector.

In the case of applications of the present method using maps based on RF signals (i.e. Wifi, Bluetooth, NFC or others) the other sensors that may be available in the portable device enable a measurement of such signals to be acquired.

In one embodiment of the present invention, the map M could be accompanied by a digital representation of physical constraints present inside the building which limit movement, such as walls, items of furniture such as tables or shelves or doors and the like, as well as a graphic representation of objects, points of interest and other elements present inside the building itself. One advantage of the method according to the present invention is that there is no need for any infrastructures in the buildings where the position of an individual endowed with a device as described above is to be localized.

Advantageously, the method according to present invention envisages the use of a device provided with a plurality of sensors selected from among an accelerometer, a magnetometer, a gyroscope, a barometer and a thermometer.

In particular, in a preferred embodiment of the present invention, the portable device can comprise an accelerometer fixed to a shoe for detecting the event of a step of the individual who is wearing it.

On the other hand, if the movement is defined, for example, on the basis of the number of rotations of a wheel, there is advantageously provided a transducer, fixed to the wheel and suitable for determining the movement thereof.

For the determination of the direction of travel, one may instead consider using solely a magnetic sensor, or in order to obtain greater precision, the combined use of an accelerometer, gyroscope and magnetic sensor, whose data are merged within suitable algorithms.

Advantageously, the direction of each step is determined, according to the present invention, by employing known techniques based on the use of Kalman filters, as described for example in Sebastian Thrun et. al, "*Probabilistic Robotics*", Publication Date: Aug. 19, 2005|ISBN-10: 0262201623|ISBN-13: 978-0262201629, or else the use of complementary filters as described in Xiaoping Yun et. al., "*An Extended Kalman Filter for Quaternion-Based Orientation Estimation Using MARG Sensors*" in proceedings of the 2001 IEEE/RSJ International Conference on Intelligent Robots and Systems Maui, Hi., USA, Oct. 29-Nov. 3, 2001, or else through the use of other filtering techniques combined with optimization methods as described in S. O. H. Madgwick et. al "*An Efficient Orientation Filter for IMU and MARG Sensor Arrays*" Department of Mechanical Engineering, University of Bristol, April 2010.

According to the present method, the orientation of the device carried by the individual to be localized is preferably expressed as a function of a set of three angles (Roll, Pitch and Yaw) or else, in a more compact manner, using a rotation matrix or a quaternion.

According to the present invention, the present method advantageously comprises estimating the individual's position by means of a recursive application of the Bel function, as described below, in order to determine the position (x,y) of each particle of the particle filter based on knowledge of its previous position and the value of the recorded environmental signals.

In particular, according to a preferred embodiment of the present invention, it is possible to model the evolution of the state, i.e. position of the device, by means of a probability density function (also indicated hereinafter with the acronym pdf) which relates the state $x_t$ to a measurement obtained from one or more sensors $y_t$.

The object is approximate the pdf on the basis of the measurements $y_1, y_2, \ldots, y_k$ made by the sensors at different instants of time.

This conditioned pdf, which here we indicate as Bel(xk), is expressible through the following relation between the state x and measurement y:

$$Bel(x_k) = p(x_k | y_k, y_{k-1}, \ldots, y_0)$$

By calculating the probability $p(x_k | y_k, y_{k-1}, \ldots, y_0)$, applying Bayes' theorem and carrying out the appropriate transformations we obtain:

$$Bel(x_k) = p(x_k | y_k, y_{k-1}, \ldots, y_0) = \frac{p(y_k, y_{k-1}, \ldots, y_0 | x_k) p(x_t | y_{k-1}, \ldots, y_0)}{p(y_k | y_{k-1}, \ldots, y_0)}$$

By transforming and further simplifying it is possible to obtain a recursive formulation of the previous one:

$$Bel(x_k) = \eta p(y_k | x_k) \int p(x_k | x_{k-1}) Bel(x_{k-1}) dx_{k-1}$$

The previous formulation enables to calculate the pdf recursively at each iteration t based on knowledge of the data measured by the sensors and the state of the previous iteration.

The previous expression cannot be evaluated analytically due to its non-linear nature and consequently it is necessary to use approximation techniques. For example, particle filters and Kalman filters belong to this set of techniques.

For more details regarding particle filters, see Sebastian Thrun et. al, "Probabilistic Robotics", Publication Date: Aug. 19, 2005|ISBN-10: 0262201623|ISBN-13: 978-0262201629.

A particle filter estimates a posteriori approximation of the pdf which is substantially representable as a set of independent samples distributed in space and which take the name "particles".

At a given iteration of the filter every "particle" substantially represents a hypothesis about the position of a user or object within space.

It can be easily imagined that the larger the number of "particles" considered in the calculation at each iteration of the particle filter is, the more probable it will be that within this set there is a "particle" which corresponds more or less precisely to the real position of the individual to be localized.

However, the use of a particle filter with a number of particles that is typically around ten thousand or so and in any case increases with increases in the size of the indoor space in which the localization takes place, entails the necessity of having to use very powerful computing systems if the analysis must be carried out in real time.

The particle filter is updated, i.e. the particles evolve to the new state, every time the end of a movement is detected and the device has detected the group of parameters and a corresponding time series of environmental signals.

In practical terms, according to the present invention, the state of each particle of the particle filter is preferably defined at least by:

two spatial coordinates of the particle, x and y,
the angle of the direction Psi of movement and
the length of the movement lp.

A preferred but non-exclusive, non-limiting embodiment of the method of the present invention is described below.

Advantageously, the method envisages the use of the aforesaid device, which comprises:

an inertial sensor suitable for detecting the dynamic conditions of the user carrying the device;
sensors suitable for detecting environmental signals;
a localization modulus suitable for making an estimate of the position of the device using a particle filter in order to evaluate the actual position of the device on the basis of the data received from the inertial sensor and from the other sensors.

According to the present invention, the method 10 advantageously comprises the following steps:

a first initialization step, in which the values of the parameters x, y, Psi and lp are assigned to each particle of the particle filter;
a second updating step, in which the inertial sensor detects the condition of the end of a movement and provides the localization modulus with an estimate of the values of the parameters x, y, Psi and lp, proceeding to update the state of each particle;
a third step of calculating the similarity index of each particle;
a fourth step of resampling the particles of the particle filter;
a fifth step of estimating the position of the device and hence of the user carrying it.

The third step preferably comprises:

first extracting the time series corresponding to each particle of the particle filter from the map M, assuming the particle to be in movement along a rectilinear trajectory which starts from the last of its assigned coordinates and arrives at the coordinates resulting from the application of the displacement and the direction of travel detected by the inertial sensor;

then, for each extracted time series, of aligning said time series extracted from map M with the one detected by the sensors during the movement and calculating for each of the latter the similarity index of the particle to which the extracted time series belongs.

The first initialization step advantageously consists in the following.

Let n be the number of particles of the particle filter. Each particle is assigned an initial value of the respective parameters x, y, Psi and lp.

Advantageously, this first initialization step envisages assigning each particle a set of values of the parameters x, y, Psi and lp.

The first initialization step comprises assigning each particle a value of the parameter psi and a value of the parameter lp in such a way that, in the set of the particles, the values assigned are uniformly distributed in an interval $[psi_0-psi_k, psi_0+psi_k]$ and [LPS−LP %, LPS+LP %], respectively, where:

$psi_0$ and $lp_0$ are the values of psi and lp detected by the inertial sensor following a first movement;

$psi_k$ is an operating parameter of the method and could for example be determined, in the preferred method, based on the precision of the sensor used to measure the reference signal. In detail, $psi_k$ represents the absolute error that can be committed by the sensor used to estimate the travel direction of the user. Therefore $psi_k$ is set according to the type of sensor used in the contingent implementation of the present invention.

For example, if the preferred method envisages the use of a magnetic sensor capable of determining the travel direction and which commits a maximum error of 10°, $psi_k$ will be equal to 10°.

LPS is an another operating parameter of the method which substantially expresses an estimate of the average length of the user's movement. The value of LPS is therefore set on the basis of the contingent conditions of implementation of the present invention; for example, in the preferred embodiment, where the movement is identified by a single step of the user, LPS is set equal to the average length of the step of a person (about 0.6 m); in another embodiment, where the movement is identified by a complete turn of a wheel, LPS is equal to the circumference of the wheel.

LP % is an estimate of the maximum allowed deviation from the average length of the step LPS. This parameter expresses the maximum allowed variability of the parameter LPS and is therefore set on the basis of the contingent conditions of implementation of the present invention; for example, in the preferred embodiment, according to which the movement is a step of the user, considering LPS=0.6 meters for a human step, LP % can be assumed as equal to 10%, and in this manner the method will consider measurements of movement that fall within the interval [0.6 m−10%; 0.6 m+10%] to be acceptable. This initialization step further comprises assigning the parameters x and y, which represent the coordinates associated with each of the particles on the map, values such that the particles are uniformly distributed over the map.

If, for example, the map is of 10 meters×10 meters in size, and a number N of particles to be used in the particle filter 100 has been selected, a uniform distribution of such particles may require that the values x,y be such that one will be found at the vertices of a hypothetical grid with a spacing of 1 meter overlaid on the map.

In accordance with this assignment, therefore, it is defined that the distribution of the value of the particles is uniform in the localization area. The aforesaid second updating step advantageously envisages that when the inertial sensor has completed the recognition of a movement, the parameters related to the particles of the particle filter are updated accordingly.

In detail, if we indicate the i-th movement detected by the inertial sensor with the subscript "i", the latter provides the values of the following parameters as inputs to the particle filter:

1. time instant of the start of the movement $ip_i$,
2. time duration of the movement $dp_i$;
3. and estimation of the angle of the direction of travel $Psi_i$,
4. an estimate of the length of the movement $lp_i$;
5. the associated time series of environmental signals detected while the movement was being carried out $ts_i$.

In particular, preferably, the inertial sensor calculates exclusively the parameters: $ip_i$, $lp_i$, $psi_i$ and the measured time series.

Following said calculation, the localization device advantageously calculates the other auxiliary parameters such as, for example, the instant at which the step ends or the net angle of direction corresponding to the net increase or decrease of the current angle of the direction of travel relative to the previous angle.

Such parameters are then input to the particle filter.

If the inertial sensor does not detect any step, but a predefined interval of time has nonetheless elapsed, the method of the present invention advantageously envisages that in the updating step the value of the angle of the direction of travel Psi is set equal to the last estimated value and the value of the length of the step lp is set equal to zero.

Said updating step preferably comprises assigning to the parameters x, y, Psi and lp of each particle the respective values given by the expressions that follow, where (t) indicates the updated values, i.e. at the current instant t, and (t−1) the values associated with the respective parameter at the sampling instant preceding the instant t:

$$Psi(t)=Psi(t-1)+Psi_{ni}+Psi_e$$

$$lpi(t)=lpi(t-1)+lpe$$

$$xi(t)=x(t-1)+lp(t)\cos(Psi)$$

$$yi(t)=y(t-1)+lp(t)sen(Psi)$$

Where:

$Psi_{ni}$ is the net angle, i.e. the difference between the angle of the direction of travel detected by the inertial sensor at time t and the angle detected at time t−1;

$Psi_e$ is a random noise term, distributed according to a Gaussian distribution or if necessary in a uniform manner, calculated on the basis of the previously described parameter $psi_k$; this term serves to take into consideration the uncertainties in the estimation of the angle of direction of travel estimated by the inertial sensor; if, for example, it has been estimated in the calibration step that the maximum error implied by the magnetometer in the calculation of the direction of travel is $psi_k$=15 degrees, the term $Psi_e$ will be a random value distributed uniformly, or distributed in Gaussian fashion, in the interval that goes from −15 to 15 degrees;

lpe is a random noise term, distributed according to a Gaussian distribution or if necessary in a uniform manner which makes it possible to take into consideration, in a manner analogous to that described in the previous paragraph for the angle of the direction of travel, the uncertainties in the estimation of the lp produced by the inertial sensor.

The third step of calculating the similarity index has the aim of selecting, also possibly with repetition, the particles that have the largest probability of approximating the position of the user, as well as approximating its actual direction of travel and the length of the step.

As noted, the inertial sensor advantageously also provides the localization modulus with a time series of environmental signals, which is hereinafter indicated as SeqI.

This time series is given by the measurement of the environmental signals during the movement of the user. In a preferred embodiment of the present invention, the time series SeqI is given by an ordered sequence of time-3D geomagnetic measurements.

The sample density of the time series during the movement, that is, the number of data acquired at a predefined sampling frequency, depends on the speed of the user during this movement. It is in fact evident that if the sampling frequency provides for the acquisition of one measurement per second, the movement being equal, the time it takes to complete the latter will determine the number of samples present in the series.

In order to take into account this fact, the method according to the present invention comprises aligning the detected time series with the mapped one.

According to the present invention, in order to align the time series it is possible to use various techniques that are in themselves traditional, including for example the techniques described in Vladimir Kurbalija et al. "A Framework for Time-Series Analysis" in proceedings of AIMSA 2010, LNAI 6304, pp. 42-51, 2010.

Preferably, according to the present invention, in order to align the time series use is made of a dynamic time warping algorithm, hereinafter indicated as DTW, which is configured to provide a measurement of the Euclidean distance between the values of the two time series to be aligned; this distance will be smaller the more similar the two time series are.

The use of algorithms such as DTW has the advantage of making it possible to treat time series in which individual components have characteristics that vary over time, and for which a simple linear expansion or compression of the two time series would not lead to satisfactory results.

According to the present invention, the step of calculating the similarity index comprises, for each particle of the particle filter:

identifying the starting point P1(x,y) and point of arrival P2(x,y) associated with a movement of the user based on knowledge of the state variables x and y of the same particle at the current instant t (point P2), estimated on the basis of the inputs coming from the inertial sensor, and at the preceding instant t−1 (point P1);

extracting from the map M the sequence of mapped environmental signals corresponding to a rectilinear movement from P1 to P2; this sequence is preferably an ordered sequence of pairs of coordinates in the map M and 3D geomagnetic measurements;

calculating the distance travelled as the Euclidean distance between the coordinates P1 and P2 and the time it takes the user to travel that distance, which is provided by the inertial sensor, transforming the aforesaid sequence of pairs of map coordinates-3D geomagnetic measurements into a time series of time-3D geomagnetic measurement pairs, hereinafter identified as SeqM;

aligning, for each particle of the particle filter, preferably via the DTW algorithm, the two time series SeqM and SeqI and calculating the similarity index.

Following the aforesaid second and third steps, each particle of the particle filter will have been assigned the updated values of the parameters x, y, Psi and lp and a value of the similarity index to which the actual probability that said particle represents the real position of the user is immediately correlatable.

The fourth step of resampling the particles of the particle filter advantageously comprises selecting the particles of the particle filter having a greater value of the similarity index, so that a very probable particle can be included in the set, possibly also appearing more than once.

For example, assuming that the particle filter has only 3 particles and that at the end of the iteration the particle P1 has a similarity index equal to 1, the point P2 has a similarity index equal to 0.4 and P3 equal to 0.0001. The resampling is such that at the end of the latter the particle filter must always have 3 particles. The result could be that the particle filter, at the end of resampling, has P1, P1 and P2 within it and that the original P3 is discarded. Therefore, P1 is taken more than once because its similarity index, like that of P2, is high, whilst the similarity index of the particle P3 was much lower. Obviously, therefore, the two instances of P1 will then evolve autonomously, i.e. during the subsequent iterations they will actually be treated as different particles (x, y, z, psi and lp will take on different values).

According to the present invention, the resampling can be performed by applying the method described in Dan Simon, "Optimal State Estimation", Ed. John Wiley & Sons, ISBN 0471708585, where following a normalization of the similarity index of the set with a cardinality n and containing all the particles, one proceeds as follows:

1. for n iterations the following operations are carried out:
   a. a random number r is generated, uniformly distributed in [0,1];
   b. all particles of the starting set are examined, adding the value of the similarity index until the sum exceeds the previous number r.

The last particle considered in the sum and which has verified the condition of r being exceeded will be included in the set of particles to be used in the subsequent iteration.

The fifth step of estimating the position of the device, and hence of the user carrying it, advantageously consists in assuming the position of the user to correspond to the centre of the group of particles having the largest cardinality among the groups.

Advantageously, the fifth step envisages a grouping step which preferably comprises:

during the initialization step, associating each particle with a group to which only the particle itself belongs;

reiteratively associating with a same group all the particles having a reciprocal distance less than a predefined value D;

interrupting the reiteration when there is no group comprising a single particle which has a distance with respect to the other particles smaller than said predefined value (D).

Advantageously, the aforesaid fifth step envisages, following the grouping step, assuming the position of the localization device to be the geometric centre of the most numerous group of particles.

At the end of the iterations it is determined which group contains the largest number of particles and the geometric centre thereof corresponds to the position of the device.

Other embodiments of the method can envisage different grouping steps, for example by means of a grouping criterion with minimum variance, maintaining the general criterion unchanged.

In summary, compared to the traditional method described, the method of the present invention differs in:
- the evolution of the particle filter, which takes place only upon every movement and preferably every step of the user;
- the use of the alignment technique at the end of the movements;
- the autonomous estimate made of the entity of the movement and direction of travel of each individual particle, which in fact makes it possible to correct the considerable imprecision in the estimate of the same quantities when made exclusively via a traditional inertial sensor;
- the mode of interaction between the localization module and the inertial module, which produces the inputs enabling the localization module to operate.

The following advantages result from such differences:
- a considerable reduction in computing times is achieved, whilst an optimal compromise is obtained;
- the alignment technique makes it possible to consider, in the calculation of the importance factor of every particle, the totality of the measurements present in the map along with those measured during the movement; whereas the traditional methods typically compare a single measurement;
- greater precision;
- the autonomous estimate provided by each particle enables the measurement of the movement and direction of travel provided, in a very imprecise manner, by the inertial sensor to be corrected in a simple and easy manner.

The invention as it is conceived is susceptible to numerous modifications and variants, all falling within the scope of the appended claims.

Furthermore, all the details can be replaced by other technically equivalent elements.

In practice, the materials used, as well as the contingent shapes and dimensions, can be varied according to the contingent requirements and the state of the art.

Where the construction characteristics and techniques mentioned in the subsequent claims are followed by signs or reference numbers, such signs or reference numbers have been used for the sole aim of increasing the intelligibility of the claims themselves and, therefore, they do not in any way constitute a limitation to the interpretation of each element identified, purely by way of example, by such signs or reference numbers.

The invention claimed is:

1. A method for the localization of an individual, which comprises:
   detecting the displacement associated with a movement of said individual;
   recording environmental signals during said movement, said environmental signals forming a detected time series;
   applying said displacement to the particles of a particle filter only at the end of said movement;
   assigning a similarity index to each particle of said particle filter; said similarity index of each particle being a parameter having a value proportional to the similarity of said detected time series with a mapped time series which consists in a time series derived from a pre-constructed map (M) and corresponding to the time series that would be detected by said individual moving along the trajectory of said particle during said movement;
   performing an operation of resampling of the particle filter which comprises making a selection of particles having a value of the similarity index that is greater than a predefined value;
   assuming the position of said individual to be the centre of a group of particles, of said selection, grouped according to a predetermined criterion;
   wherein the mapped time series are selected by:
      first extracting from the map (M) the time series corresponding to each particle of the particle filter assuming the particle to be in movement along a rectilinear trajectory which starts from the last of its assigned coordinates and arrives at the coordinates resulting from the application of said displacement complemented by the movement direction;
      then aligning, for each extracted time series, said time series extracted from map (M) with said detected time series and calculating for each of the extracted time series the similarity index of the particle to which the extracted time series is associated;
   wherein said predetermined criterion provides for the formation of groups of particles having a reciprocal distance that is less than a preset value or having a variance of said environmental signals that is less than a predefined value;
   wherein said formation of group of particles provides for a grouping step which comprises:
      during an initialization step, associating each particle with a group to which only said particle itself belongs;
      reiteratively associating with a same group all the particles having a reciprocal distance less than a predefined value (D);
      interrupting the reiteration when there is no group comprising a single particle which has a distance to the other particles smaller than said predefined value (D);
      assuming the position of the localization device to be the geometric centre of the most numerous group of particles.

2. The localization method according to claim 1, characterized in that said step of detecting the displacement comprises detecting a start condition and an end condition of said movement of said individual.

3. The localization method according to claim 1, characterized in that said displacement is given by the length of said movement, i.e. by the amount of space travelled during said movement and the direction of said movement.

4. The localization method according to claim 1 characterized in that said step of recording environmental signals comprises the recording of geomagnetic signals, said time series being given by the pattern of the geomagnetic field over time.

5. The localization method according to claim 1, characterized in that said step of recording environmental signals is carried out by means of a portable device carried by said individual during said movement.

6. The localization method according to claim 1, characterized in that said step of assigning to each particle of said particle filter a similarity index comprises comparing the mapped time series of each particle with said detected time series and associating each particle with a similarity index that consists in a parameter indicating the similarity between said mapped time series and said detected time series.

7. The localization method according to claim 1, characterized in that said step of comparing said mapped time series and said detected time series comprises the use of an algorithm for aligning the time series, preferably of the dynamic time warping type.

8. The localization method according to claim 1, characterized in that it comprises a preliminary mapping step which comprises:
- positioning an environmental signal sensor;
- recording the environmental signals detected by said sensor;
- associating said detected environmental signals with the position of said sensor;
- reiterating said positioning, recording and associating operations so as to form said map (M) of environmental signals associated with respective positions.

* * * * *